SLOTS-CONTAINING BODIES IN FLUID HANDLING DEVICES

Filed May 22, 1967 4 Sheets-Sheet 1

INVENTOR
KARL EICKMANN

BY Michael J. Striker

ATTORNEY

INVENTOR
KARL EICKMANN
BY Michael S. Striker
ATTORNEY

SLOTS-CONTAINING BODIES IN FLUID HANDLING DEVICES

Filed May 22, 1967 4 Sheets-Sheet 3

INVENTOR
KARL EICKMANN

BY Michael S. Striker

ATTORNEY

INVENTOR
KARL EICKMANN

BY *Michael S. Striker*

ATTORNEY

United States Patent Office 3,417,706

Patented Dec. 24, 1968

3,417,706

SLOTS-CONTAINING BODIES IN FLUID HANDLING DEVICES

Karl Eickmann, 2420 Isshiki, Hayama-machi, Kanagawa-ken, Japan

Continuation-in-part of application Ser. No. 328,395, Dec. 5, 1963. This application May 22, 1967, Ser. No. 640,132

22 Claims. (Cl. 103—136)

ABSTRACT OF THE DISCLOSURE

This disclosure is related to a slotted body in a fluid handling device wherein vanes move outwards and inwards in slots. In order to handle high pressure fluid, the body is provided with uninterrupted integral annular peripheral portions which partially close the radially outer ends of the slots and rigidly connect sections of the body formed between the slots.

*Cross-reference to related application*

The present application is a continuation-in-part of my U.S. patent application Ser. No. 328,395 filed Dec. 5, 1963, now U.S. Patent No. 3,320,898, issued on May 23, 1967.

There are fluid handling devices wherein a slotted body is a rotor of the rotary vane type. The enclosing body is either stationary or also rotary. It is however also possible, in accordance with my said parental patent application, to utilize the slotted body also as a stator, while the enclosure body then may either be rotary or be moved relative to the axis of the body in such action, that a periodic enlargement and contraction of the intervane spaces occurs.

A typical rotary fluid handling device is disclosed in my U.S. Patent 2,975,716. Vane assemblies, which are especially effective for sealing the individual intervane spaces and which can be inserted into the slots containing body are disclosed in my U.S. Patents 3,099,964 and 3,158,103 for example. By those patents the sealing of the individual intervane spaces in vane type fluid handling devices has been so highly improved, that the sealing effect is also achieved and maintained at very high pressure of several thousand p.s.i. in the fluid, which is handled in the fluid handling device. The power of fluid handling devices of a given size is thereby highly increased.

The slots containing bodies or rotors in those vane machines of my earlier inventions were however provided with slots, which were open at their outer radial ends. The slots were then closed by additional ring means or covers. A plurality of discs were assembled together on order to form a slots-containing body for the reception of the vanes in the slots of the body or rotor. Those discs were provided with bores for the reception of bolts, which fastened the several discs together to form a complete slots-containing body for use in the fluid handling device. Since the slots in the sidewalls of the slots-containing body or rotor of the fluid handling devices of my earlier inventions were open in radial outward direction, the slots-containing bodies were thereby divided into a plurality of sectors, partially separated from each other by the slots.

As a consequence thereof, the body had no strength in tangential direction. This lack was partially overcome by the extension of the bolts through outer end covers of the slots-containing body. Each bolt, extending through a bore in the slots-containing body and through bores with the thereto same axes in end covers, kept not only the slots-containing body parts together, but also held the segments of the slots-containing body in tangential direction. This was quite satisfactory at low or medial pressures in fluid in the chambers of the fluid handling devices.

In accordance with this invention such fluid handling bodies of my earlier inventions have been tested for mass production and for high pressures in fluid. Thereby a great disadvantage of my earlier inventions has been discovered. This is, that the high increase in pressure resulted in very high tangential loads on the vanes in the body. Those vanes or their extensions transferred a very high load to the walls of the slots in tangential direction, if fluid under high pressure was acting in opposite intervane space. Since the body sectors were radially outwardly unsupported, they moved under this high load away in tangential direction, thereby bending the inner portions of the body under load and spreading the slots. The deflection was off course only very little, in the range of a thousandths of an inch. But the little deflections, unvisible to the human eye, were the reason for internal leakages from intervane spaces into slots spaces or vice versa. Attempts to make the slots-containing bodies stronger by narrowing the clearances between walls of the respective bores and the bolts through the sectors of the body and end covers thereof resulted in additional manufacturing difficulties, but could not prevent the deflection of the segments of the bodies, because they could not be set sufficiently radially outwards. The flow of leakage fluid through the widened clearance between a vane wall and a slotwall was an internal leakage loss of the machine, not appearing to the outside of the machine but resulting in a loss of volumetric efficiency and power of the machine. At same time also a drop of the mechanical efficiency of the fluid handling device occurred, because deflection of a segment of the body resulted respective to another vane in a narrowing of the clearance between it and the neighboring slot walls. That increased the friction.

It is therefore the object of this invention, to overcome the difficulties, power losses and efficiency losses of my earlier invention by providing a slotted body which is perfectly resistant in tangential direction, which provides high strength and rigidity of the walls of the slots in tangential direction to improve the capability to support the vanes and which is easy to be machined and accurately built. This is materialized by providing an uninterrupted outer portion on the endwalls of the slotted body. This keeps all sectors of the body and its endwalls together and prevents any tangential deflection of the slotwalls of the sectors of the body.

It is therefore the primary object of this invention to provide a vane supporting body for devices with an uninterrupted outer portion on each end wall member of the body, thereby obtaining undeflectable walls of the slots of the slots-containing body and capability to support the vanes on slotwalls effectively also under high tangential loads on the vanes.

The losses in fluid handling devices of my earlier inventions have thereby been reduced or prevented. The slotted body of this invention is even so much strengthened, that it can also be used in fluid handling devices of the rotary body type as well as in stationary body types. Also the passages through parts of the body for passing fluid to and from the intervane spaces can now be provided in respective portions of the body.

More objects or features of the invention are:

(a) to provide a slots-containing body with slots, which extend axially through, but radially not through said slots-containing body;

(b) to provide an uninterrupted inner part of the body;

(c) to provide an uninterrupted rotor outer part and/or an uninterrupted rotor end wall outer part;

(d) to provide an uninterrupted axial rotor end wall part;

(e) to provide intersecting grooves or recesses in a slotted body in fluid handling devices;

(f) to provide a hub in a slotted body;

(g) to provide fluid passages in a slotted body;

(h) to provide slot passages or working chamber passages extending through the body into the hollow hub of said body;

(i) to provide axially directed fluid passages through end walls or end portions of said body;

(j) to provide end covers for closing slots in the said slotted body; and (k) to provide a slots-containing body wherein slots extend into but not through the end portions of said body.

A further object and embodiment of the invention is, to provide a slotted body assembly which consists of discs and can be taken apart for insertion of a closure member between the end walls of the body and which can be assembled thereafter again, whereby strongest rigidity in tangential and radial direction is maintained and a plurality of members and portions maintain the rigid fixation of the discs of the slotted body relative to each other.

It has been found in accordance with this invention that it is possible to prevent radial deformations and therefrom resulting leakages and also to prevent the tangential deformations of the body sectors and the therefrom resulted leakage through the spread space between vane and rotor slot wall. This is achieved by making covering means, which cover the rotor end wall slots radially integral with the sectors of the end walls and thereby, that the uninterrupted outer, peripheral portions close the end wall slots radially. A plurality of bolt fits in holes of a plurality of rotor portions and of end wall portions hold and keep the respective discs of the body rigid in tangential direction.

*Brief description of the drawing*

For an understanding of the principles of the invention, reference is made to the following description of typical embodiments thereof as illustrated in the accompanying drawings. More details, features, embodiments and/or objects will become apparent from the figures thereof.

In the drawings:

FIGURES 23 to 28 show another embodiment of a body of this invention, which could also be assembled into the device of FIGURES 15 and 16; and wherein FIGURE 23 is a longitudinal section through a medial portion of a body;

FIGURE 24 is a longitudinal section through an endcover of a body;

FIGURE 25 is a longitudinal view through a combined medial portion and an endwall of a body;

FIGURE 26 is a longitudinal section through an endwall of a body;

FIGURE 27 is a longitudinal section through an endcover of a body; and

FIGURE 28 is a cross-sectional view through FIGURE 25 along the line XXV—XXV.

FIGURE 29 is a view upon a thrust member to be inserted into the endcover of FIGURE 27.

FIGURE 32 is a cross-sectional schematic view through a rotor of this invention and a sketch, explaining the action of fluid upon a rotor and the resisting means and members of a rotor of this invention.

For a good understanding of the invention it is now first referred to the schematics of FIGURES 30 and 31. FIGURE 30 shows a rotor of a fluidhandling device of my Patent 3,275,716 in a cross-sectional schematic view. Vanes 409 are borne in the slots of the rotor end walls. Fluid under less pressure acts in the figure from left upon the rotor and vanes and fluid under high pressure shown by arrows 401 and 402 acts tangentially upon the vanes on top and under of the rotor. The force of this fluid trends to brake the rotor segments toward the left. The rotor sectors between slots are not kept together on the outer periphery and held only by one bolt 405 or 406 and one inner integral portion 403 or 404. This two means cannot withstand the high fluid forces 401 and 402. The sectors 407, 408 are deflected a little bit leftwards in the direction of arrows 414. A small clearance opens then between the right face of vanes 409, 410 and the slot wall of the sector on the right thereof. Therethrough leakage fluid escapes out of the adjacent intervane space and slot space which reduces the efficiency of the machine. Fluid forces are also acting outwardly against the inner face of the ring means 412 in the direction of arrows 413. The enclosure ring 412, radially surrounding the end walls of the rotor elongate elongates, so that a small clearance 411 appears, wherethrough another amount of leakage flows from high pressure spaces to low pressure spaces, also narrowing the machine's efficiency.

On contrary thereto

Figures 1, 2, 3, 4:
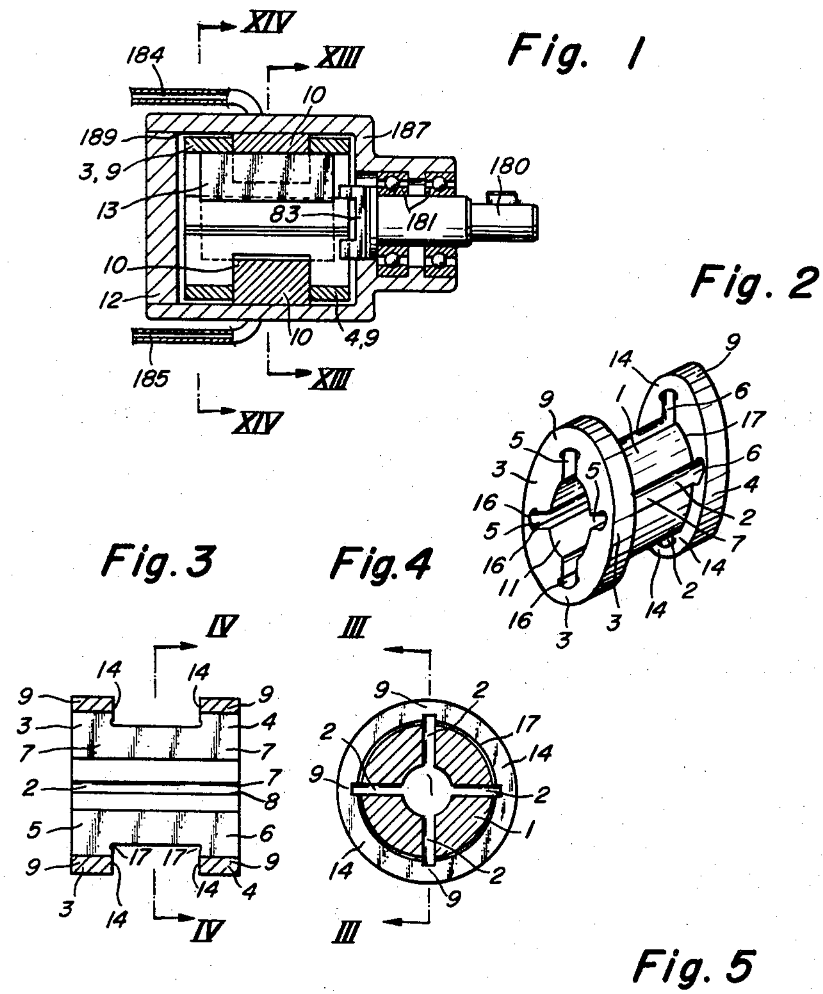
FIGURE 1 is a longitudinal view through one embodiment of a fluid handling device of this invention, containing slotted body of the invention.
FIGURE 2 shows the body of FIGURE 1 in perspective view.
FIGURE 3 is a longitudinal section through the body of FIGURE 1.
FIGURE 4 is a cross-sectional view through FIGURE 3 along the line IV—IV.

A new kind of fluid motor or fluid pump is contained in casing 187 of FIGURE 1. This new kind of fluid machine is additionally illustrated by the sections 13 and 14. In addition to that the casing element 10 of the said machine is separately shown by FIGURES 6 and 7. A slotted body or rotor 1 with its end walls 3 and 4 is additionally separatedly shown by FIGURES 3 and 4 and is shown in a perspective view by FIGURE 2. As will be visible from FIGURE 1, the fluid passage 184 transmits the fluid under pressure, which was produced in a fluid machine, to the entrance port 118 of the fluid machine contained in casing 187. From entrance port 118 the fluid under pressure enters into the respective intervane space 19 and supplies force by a fluid under pressure against the respective vane 13. Forced by this fluid under pressure the body or rotor 1, as will be seen from FIGURE 13, starts to revolve in the direction of the arrow. The fluid under pressure of space 19 passes thereafter into the position of the respective intervane space 119 and takes after a certain time interval during revolving of rotor 1 the location of the intervane space 219 whereafter the fluid at lower pressure leaves intervane space 319 through exit port 218 and flows thereafter through exit passage 185 back to a fluid reservoir or tank or into the respective working space of a fluid machine.

Fluid passages or fluid lines 184 and 185 to the fluid machine contained in casing 187 are shown by way of example only. The fluid may also flow in reversed direction.

The way of flow of fluid described heretofore with respect to the fluid machine contained in casing 401 is known in the art.

Figures 6, 7, 8, 9, 11, 12, 13, 14:
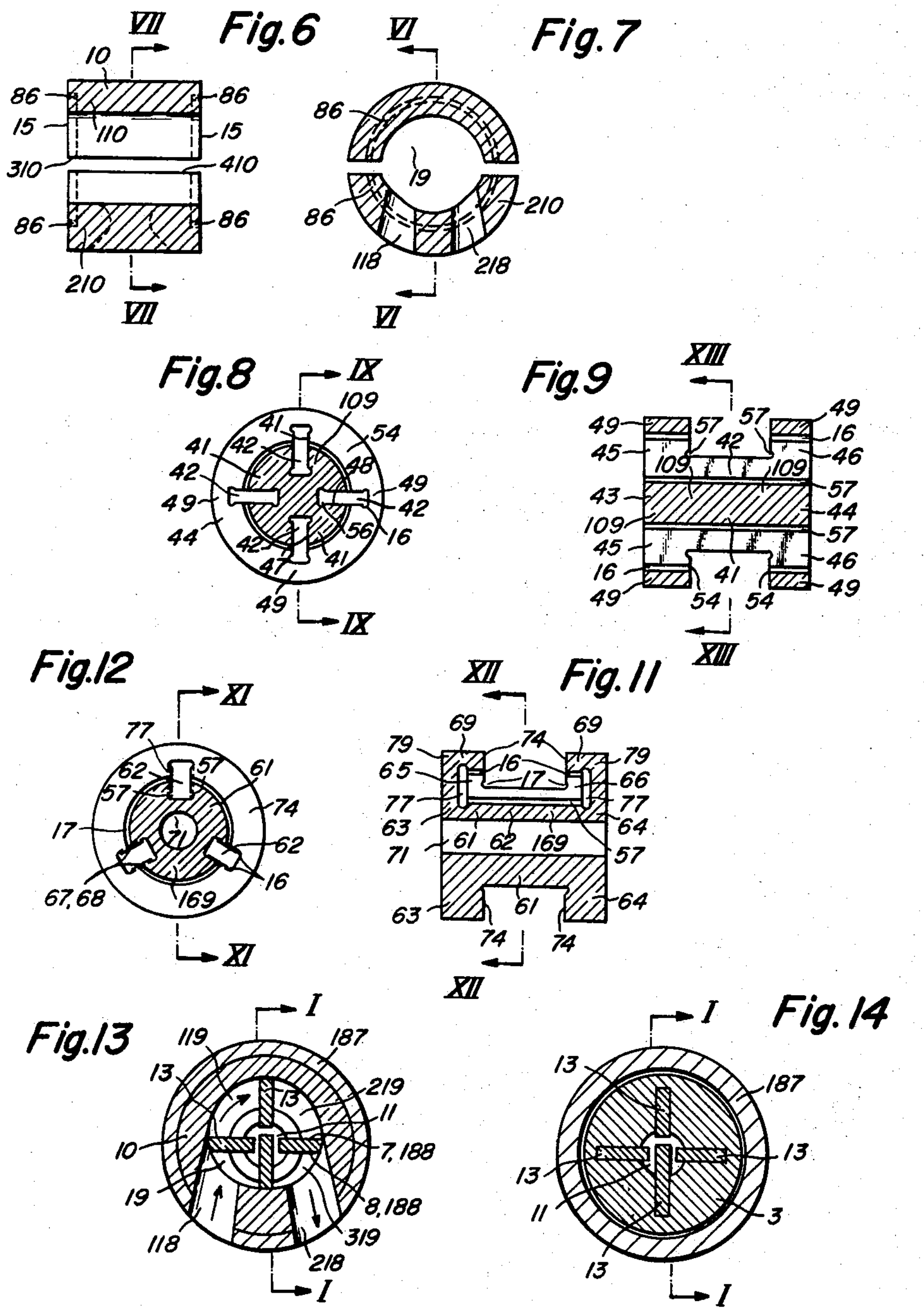
FIGURE 6 is a longitudinal sectional view through a closing member of FIGURE 1.
FIGURE 7 is a cross-sectional view through FIGURE 6 along the line VII—VII.
FIGURE 8 is a cross-sectional view through FIGURE 9 along the line VIII—VIII.
FIGURE 9 is a longitudinal sectional view through another embodiment of a body of this present invention.
FIGURE 11 is a longitudinal sectional view through another embodiment of a body of this invention.
FIGURE 12 is a cross-sectional view through FIGURE 11 along the line XII—XII.
FIGURE 13 is a cross-sectional view through FIGURE 1, taken along line XIII—XIII of FIGURE 1 and demonstrating another object of this invention, which is the provision of a long vane stroke in a fluid handling device.
FIGURE 14 is a cross-sectional view through FIGURE 1 taken along the line XIV—XIV.

However in accordance with this invention a special object of this invention is solved by the structure of body or rotor 1 and/or of casing element 10. Casing element 10 is radially divided into two casing element parts 110 and 210. The dividing faces 310 and 410 are perfectly plane. After the divided faces 310 and 410 of casing element 110 and 210 abut, both casing element parts 110 and 210 are forming together a complete casing element 10. In FIGURES 1 and 13 a complete casing element 10 having parts 110 and 210 is shown. Both casing element parts 110 and 210 are kept together or forced together by way of example by the surrounding casing 187 wherein the casing element parts 110 and 210 are contained.

In FIGURES 6 and 7 both casing element parts 110 and 210 are shown separated from each other. The division of the horizontal dividing faces of FIGURES 6 and 7 is by way of example only. It would also be possible to divide casing 10 by vertical division faces or by inclined division faces into casing parts 110 and 210. Also the division of casing element 10 into two parts is by way of example only. It will also be possible, by those skilled in the art without leaving the scope of the invention to divide casing element 10 radially or axially and radially into casing element parts. An also special method of dividing casing element 10 is the division by horizontal and vertical dividing faces whereby casing element 10 would be divided into four parts.

The radial division of casing element 10 into at least two parts is an important means for reaching the combination of this invention contained in casing 187.

The said radial division of the enclosing body 10 into at least two casing element parts 110 and 210 is one of the suitable means to make it possible to insert the casing element 10 between the end walls 3 and 4 of the body or rotor 1. The enclosure body end faces are tightly sealing engaged between the inner end wall faces 14 of the end walls of body 1. By the structure of body or rotor 1 with end walls 3 and 4 an especially simple body or rotor 1 which can be manufactured out of one piece of material, is obtained. Rotor 1 and rotor end walls 3 and 4 are forming together one body, the slotted body of this invention. Rotor end walls 3 and 4 are extending radially beyond the central rotor part 1. Into the corners wherein rotor center part 1 and the innermost end wall faces 14 of rotor end walls 3 and 4 are meeting, there are the intersecting corner grooves 17 provided. The intersecting grooves 17 are especially suitable to make an accurate machining of the outer diameter of rotor part 1 and of the innermost side wall faces 14 and 15 of the rotor end walls 3 and 4 possible. Also in accordance with another embodiment of this invention enclosure-body end faces or casing element end faces 15 are provided on the arial ends of the casing element 10 or of casing element parts 110, 210 and/or others.

The said innermost end walls faces 14 are so distanced from each other and the said close body end faces 15 are so far distanced from each other that the said casing element end faces 15 are able to fit between the said innermost end wall faces 14 of the other end walls 3 and 4.

Thus the divided casing element parts 110 and 210 are radially from outwards inserted between the rotor end walls 3 and 4 until the divided faces 310 and 410 of casing element parts 110 and 210 abut each other and a complete casing element or enclosure body 10 is thereafter inserted between rotor end walls 3 and 4 surrounding the rotor center part 1 and forming the working space between rotor end walls 3 and 4, rotor center part 1 and casing element 10. After such assembly the casing element end faces 15 and 15 are closely fitted against the respective innermost end wall faces 14 and 14 of rotor end walls 3 and 4 and maintain an effective seal against them and enabling relative rotary movement relatively to each other. A clearance is formed between casing element end faces 15 and the adjacent innermost side walls faces 14 and 14.

Another important object of the invention is to provide end walls slots 2 of the invention in body or rotor 1 and rotor end walls 3 and 4.

In order to provide the slots 2 it is especially suitable in accordance with this object of the invention to provide a centre bore in the hub 11 of rotor 1 and rotor side walls 3 and 4.

Extending radially outwards from the rotor centre bore 11 are the slots 2 provided. They are extending radially outwardly also into the respective rotor and end walls 3 and 4 so far that they radially outwardly extend entirely through rotor center patr 1 while they do not extend radially outwardly entirely through rotor end walls 3 and 4. On the contrary, it is important in accordance with this invention, that radially outwardly of the end wall slot portions 2 uninterrupted annual integral outer end wall portions 9 of rotor end walls 3 and respective uninterrupted integral outer rotor end wall parts 9 of rotor end wall 4 remain. The said uninterrupted annular peripheral parts 9 have the effect that the whole rotor center part 1 and rotor end walls 3 and 4 remaining held together as a one piece integral body. Intersecting corner grooves may be provided in the radial outward ends of the respective slots 2. The slots 2 may be easily machined from the center bore 11 radially outwards through rotor center part 1 and into rotor end walls 3 and 4 by broaching or the like. The walls of the said slots 2 form longitudinal guide faces 7 and 8. The longitudinal guide faces 7 and 8 are able to bear and guide the respective vane 13 during its outwards and inwards travel in the fluid handling device.

In addition the rotor has great strength especially in tangential direction because the uninterrupted outer end wall parts 9 adds strength in peripheral direction to rotor end walls 3 and 4. In the embodiment which is shown in the figures, there are four slots 2 provided by way of example only. It is also possible to provide only one or a plurality of radial slots 2 in accordance with this invention.

Vanes 13 may be inserted from one axial end into the respective end slots 2. The longitudinal bearing faces 188 of the respective vane 13 will abut on and be guided by the respective longitudinal guide faces 7 or 8 of the respective radial vane slots 2.

The whole rotor casing element and vanes assembly may be inserted into the bore 189 inside of housing 10 and may be contained therein. The open end 189 in casing 10 may be closed by a casing cover means 12. After the closing of casing 10 all parts will be contained inside of housing 10. A shaft means 180 may be suitably supported in bearing means 181 while the bearing means 181 may be supported in an end of casing 10. Clutch means or clutch fingers 83 may be provided on the shaft means 180 and said clutch fingers 183 may extend into slots 2 or into other clutching recesses in end walls 3 or 4.

In the embodiment which was discussed with respect to the said figures, van 9 are formed as simple plates. But it would also be possible to insert vane assemblies of my earlier U.S. Patent 3,158,103, consisting of vanes 9, pivot members and slide elements into the machine of FIGURE 1. It is not difficult to insert such kind of vane assemblies in the embodiment of FIGURES 1 to 4 and 6 to 7, because it is possible to insert the slide element at least radially, from outwards into a position between innermost end wall faces 14 and to insert the vanes 9 in axial direction into the respective rotor and endwall slot 2.

Another object or means of this invention is illustrated by the eccentric seal beds or casing seal beds 86 of FIGURES 6 and 7. The said eccentric seal beds 86 are at the respective axial end and formed in the casing element 10. The specialty of these seal beds 86 is, that the axis of the seal beds is eccentrically provided with respect to the axis of the casing 10 or of the rotor 1.

The feature of such eccentric casing seal bed 86 is, that if seal rings or seal ring parts are provided therein, then the seal faces of such seal ring means will have an additional relative radial movement along the seal faces of the adjacent innermost 14 end faces 15 and 15. Such additional radial movement prevents sticking, provides a self lapping between the seal faces and thereby narrows friction and improves the sealing effect.

Still more examples of the invention are shown in FIGURES 5, 10, 8, 9, 10 and 11. The said slots containing bodies or rotors are consisting, as it is conditioned in this invention of the rotor center parts 21, 41 and 61 and end wall means 23, 24, 44, 43, 63 or 64 at each axial end of said center parts of the slotted body or rotor. The side wall means are consisting in accordance with this invention, of the rotor end walls 23, 24, 43, 44, 63 and 64 and the innermost end wall faces 34, 54 or 74 provided in the end wall means.

As it is also in accordance with the invention there are slots 22, 42, and 62 provided in the slotted body and the said slots are extending into or through the respective rotor center parts 21 and 41 or 61, 63 or 64 and into the respective end walls 23, 24, 43, 44.

The slots are provided with longitudinal guide faces 28, 48 and/or 68.

However, the slots 8 and 9 have special characteristics and special features.

The characteristics of the slots 4 in FIGURES 8 and 9 is, that those slots are extending axially entirely through the rotor end wall 43 through the rotor center part 41 and through the rotor end wall 44 and that they do not extend in radial direction through the said rotor end walls but on the contrary only into the same. It can be clearly seen from the figures that the slots 42 extend radially inwardly into body 41 and its end walls 43 and 44 but radially inwardly not therethrough. On the contrary uninterrupted annular inner parts 109 remain in body 41 and end walls 43 and 44 on the bottom of the slots 42. The slots 42 are extending through the rotor center parts 41 radially outwards but they do not extend in radial outwards direction all the way through the rotor end walls 43 and 44. On the contrary they are extending in radial outwards direction only into the rotor end walls 43 and 44, so that the uninterrupted end wall outer parts 49 are remaining outwards of slots 42. In the corners between the annular rotor end wall outer parts 49 may be the intersecting longitudinal corner recesses 16 provided. Between the annular parts 109 and the respective slots, longitudinal guide faces 47 or 48 may be the longitudinal intersecting cover recess 56 provided.

The advantage of the slots 42 of FIGURES 8 and 9 is that these slots can be very easily manufactured by broaching or other means and that the integral one piece rotor and slots containing body remains strong despite of the slots. This rotor is therefore very economical and capable of high pressure and a long useful life.

The slots 22 of FIGURES 11 and 12 are extending in radial direction and in axial direction only into, but not through the body 61 and the end walls 63 and 64.

Consequently the uninterrupted peripheral annular parts 69 of end walls 69 and 64 close the radially outer ends of slots extensions 65 and 66.

Since the said slots 62 do not extend axially through the rotor end walls, there are remaining the undisturbed outer parts 79 on the rotor end walls 63 and 64 and they are closing the slot extensions 65 and 66 in axial outwards direction.

In radial inwards direction there remains the uninterrupted inner part 169 and closes the inner radial end of the respective slot 62 and the slot extensions 65 and 66.

Between the radial outer parts 69 and the respective adjacent longitudinal bearing faces 67 or 68 may outer corner recesses 16 be provided.

Between the axial uninterrupted end wall parts 79 and the respective adjacent longitudinal guide faces 67 or 68 may the recesses 77 be provided. Between the inner part 169 and the respective adjacent guide faces 67 or 68 may the inner corner recesses 57 be provided. In other embodiments, if so desired, said intersecting recesses or grooves may be omitted.

The slotted bodies of this invention can be provided with center bores and hubs, for instance center bores 11, 31, 51 or 71.

The slotted bodies serving as rotors may be provided with rotor passages in radial or axial direction. For instance as shown by FIGURES 5 and 10.

The advantage of the slots 62 of FIGURES 11 and 12 is, that such slots are closed in radial and in axial directions and that no closure means for closing the slots in radial and axial directions are required. Additionally the rotor or body of FIGURES 11 and 12 is very strong and very resistant against tangential forces.

Another feature of the slotted body of FIGURES 11 and 12 is, that such kind of bodies can be pressed or cast for instance of artificial plastic material, Bakelite, casting metal, iron or the like.

Figure 10:
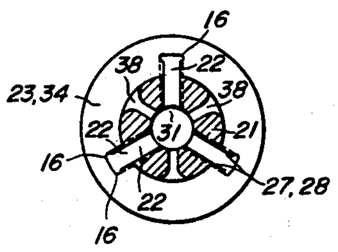
FIGURE 10 is a cross-sectional view through FIGURE 5 taken along the line X—X.
Figure 5:
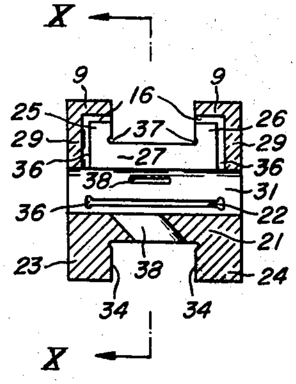
FIGURE 5 is a longitudinal sectional view through another embodiment of a body of this invention.

The slots 22 of FIGURES 5 and 10 are extending radially inwardly through the body center part 21 and the body end walls 23 into the hub cavity 31. But the slots 22 are extending in radial outwards direction and in axial direction not all the way through the end walls 23 and 24 but only into the same. Consequently the annular outer parts 9 on the end walls 23 and 24 close the respective slots extension 25 and 26 in radial outwards direction. The axial end parts 29 are also remaining on the end walls 23 and 24 and they are closing the respective slots 22 in axial direction.

Between the annular outer parts 9 and the respective adjacent longitudinal guide faces 27 or 28, corner recesses 16 may be provided. Between the respective axial end parts 29 and the respective adjacent longitudinal guide faces 27 or 28 may the corner recesses 36 be provided.

In other modifications upon desire the respective intersecting recesses may be omitted. The rotor or body 21 may be provided with fluid passages 38.

The body or rotor made of one piece and integral as shown in FIGURES 5 and 10 has several advantages.

One advantage is, that this body does not need any closure devices or closing means for closing the slots 22 in axial or radial direction because these slots and the respective slots extension 25 and 26 are closed in axial and radial outwards directions by the respective axial end parts 29 and/or closed in radial direction by the respective end wall outer annular parts 9.

Another advantage is, that this integral body or rotor has very high strength and is therefore capable to resist high pressure and great tangential forces, and therefore has a long useful life. It can also easily be manufactured by casting or molding methods and is therefore very economical.

Another feature is that the slots 22 are open in radial inwards direction, so that they extend into the hub cavity 31. The slots 22 therefore do not need any fluid passages.

Respective control bodies may be fitted into the rotor center bore or cavity for the control of the flow of fluid into and out of respective slots 22 and of the flow of fluid through the fluid passages 38 into and out of the respective intervane spaces.

Of course, it would also be possible, to make the end walls separated from respective center part. Such modifications are within the scope of this invention.

Figure 15:
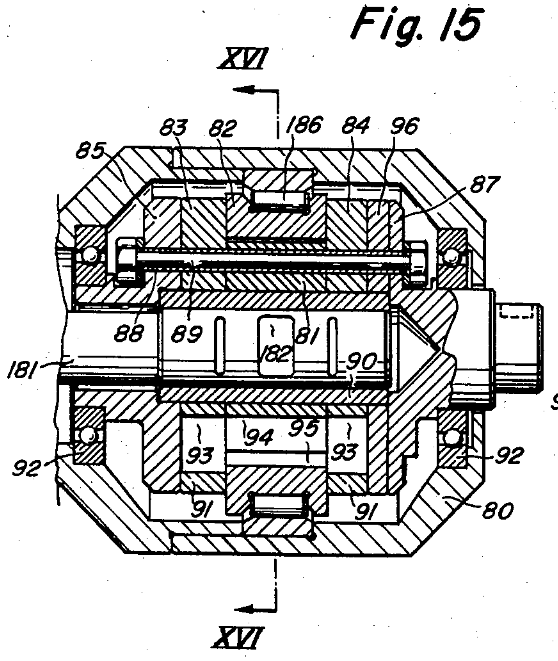
FIGURE 15 is a longitudinal sectional view through another fluid handling device whereinto another embodiment of a body of the invention is assembled.
Figure 16:
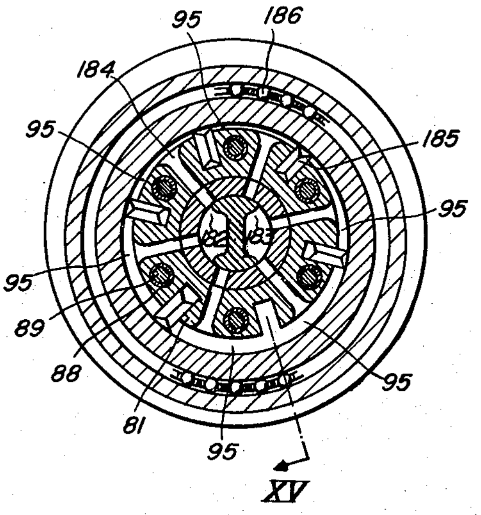
FIGURE 16 is a cross-sectional view through FIGURE 15 along the line XVI—XVI.
Figures 17, 18, 19, 20, 21, 22:
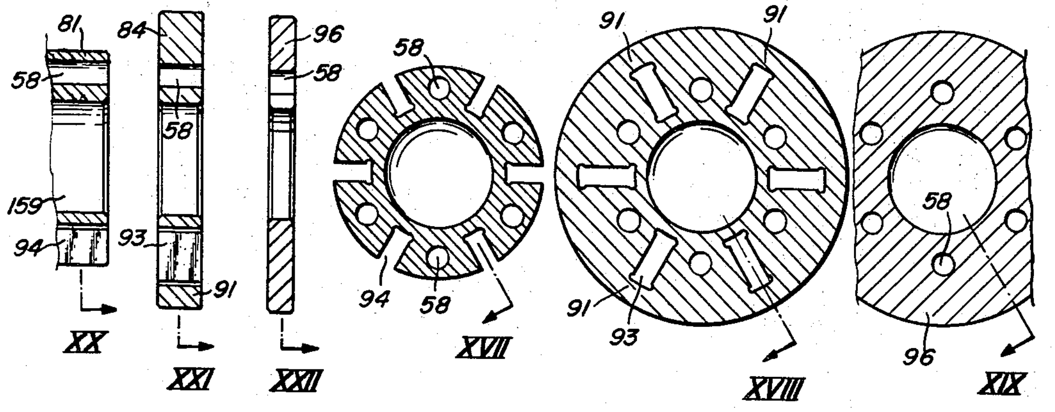
FIGURE 17 is a longitudinal section through the medial member of the body of FIGURE 15.
FIGURE 18 is a longitudinal section through an endwall of the body of FIGURE 15.
FIGURE 19 is a longitudinal section through an endcover of the body of FIGURE 15.
FIGURE 20 is a cross section through FIGURE 17.
FIGURE 21 is a cross section through FIGURE 18.
FIGURE 22 is a cross section through FIGURE 19.
Figures 23, 24, 25, 26, 27, 28, 29:
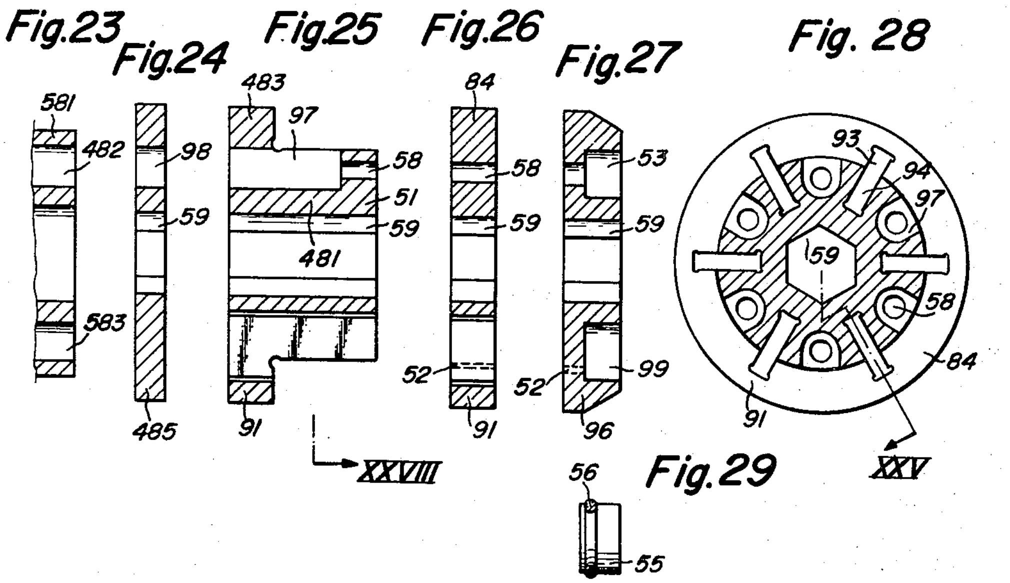
Figure 30:
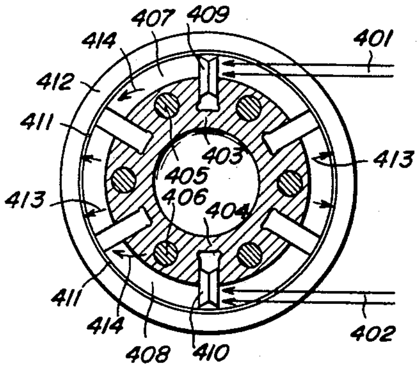
FIGURE 30 is a cross-sectional schematic view and sketch, which shows the action of fluid upon a rotor and the resisting members of the rotor; of a known type.
Figure 31:
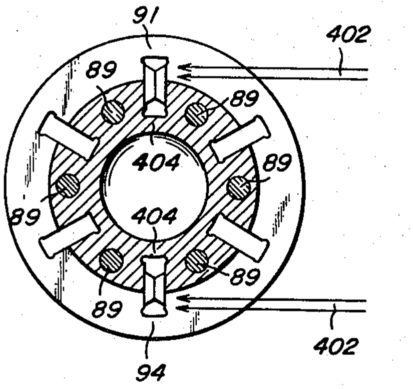
FIGURE 31 shows the schematic cross-sectional view through the slotted body of this invention, which may consist of discs. The uninterrupted outer annular peripheral portions 91 and the uninterrupted annular innerportions 404 keep the whole body or the end walls together to one integral rigid piece. There is no ring or cover surrounding the end walls, and therefore no clearance 411 appears. Furthermore the uninterrupted portions 91 are short in tangential direction, so that they cannot deflect radially outwardly or inwardly. All bolts 89 are fitting in axially extending holes in the body and in the end walls thereof. Fluid forces 402, acting against the body or rotor can no more tilt a sector, because there remain no sectors. The whole body and the endwalls are on the inner and outer radial portions annular and integral with the uninterrupted outer portions, 91. The sum of all fits of all bolts and the sum of the diametrically located uninterrupted innermost and outermost end wall portions keep the body and endwalls rigid in tangential direction, preventing appearance of clearances and leakages.

In the embodiment of a slots-containing body of this invention, assembled into a fluid handling device of FIGURES 15 and 16, the slots-containing body is divided into the center portion or rotor 81 and the end walls 83 and 84 at both ends thereof. Axially outwards of the end walls 83 or 84 respectively are the end covers 85 and 96 respectively located. At least one end wall is a flat disc. Center portion, end walls and end covers are having the same axis and are bolted together by retaining bolts 89 and nuts. Through each sector of the center portion extends axially a bore, which registers with respective bores in the end walls and preferably also in the end covers. The retaining bolts are fitted thereinto. Often it is convenient to insert bushes 88 fitting into the bores 58. A bush 90 may be inserted into the hubs of the center portion and end walls, so that the center portion and end walls are fitted upon the outer face of said bush 90. As shown in FIGURE 15, the bush 90 is axially fixed between portions of the end walls. In FIGURE 15 by way of example, the rotor center portion 81, the rotor end walls 83 and 84 and the end covers 85 and 96 are centered and fitted upon the center bush 90. The slots 94 are provided in the center rotor, portion 81. They extend radially from outwards thereinto and they extend axially therethrough. The slot extensions 93 are provided in the end walls 83 and 84, and they extend axially therethrough and they register angularly with the slots 94 in the rotor or medial portion 81. The slots 93 in the end walls are closed radially outwardly by the uninterrupted outer annular portions 91 of this invention. Radially inwards they are closed by innermost annular portions, as is also the center part 81. A shaft with a flange 87 may be fixed to the body for the supply of rotary movement thereto or in order to take rotary power of therefrom. Parts or extensions of the slots-containing body may be so located and configurated, as to fit in bearings 92, which are placed into a housing 80, so that the rotor with its members and discs may revolve on those bearings.

A stationary, or, as shown in FIGURES 15 and 16, a rotary casing 82 may be fitted between the innermost faces of the end walls of the rotor. It may be rotatably supported in bearing 186 and revolve therein. It has under operation of the machine under power an axis spaced from the axis of the rotor. The end walls extend radially beyond the center rotor part and they embrace partially the end faces of casing 82 and form a seal with those end faces. Vanes 185 are inserted into the slots 94 of the center portion and they extend into the slots in the end walls 93 and 94. They are able to move inwards and outwards in said slots and they slide on walls of that slots during their inwards and outwards travel. The casing 82, the part 81, and the end walls 83 and 84 are forming together and enclosing together a working space, which is divided by the vanes 185 into individual intervane spaces. A control body containing fluid flow passages and fluid flow control ports 182 and 183 may be adapted for tight sealing sliding along a control face of the rotor and passages 184 may pass fluid from a control port into intervane spaces or from intervane spaces into a control port. Thus, if the machine operates, which means, if the rotor of the machine of FIGURES 15 and 16 revolves, fluid flows through the control body and passages into the intervane spaces and out thereof. It may be a liquid, if the device operates as a pump or motor. It may be air or gas etc., if the device operates at a compressor, engine, motor or the like.

Due to the described uninterrupted outermost annular portions of the integral end walls of the slots containing body and due to the fitting of connectors 88 into registering bores of the parts of the rotor, the assembly has become rigid in radial and tangential direction and deformations, elongations, appearance of clearances and leakages are effectively prevented. The efficiency and power of the device is thereby considerably increased.

While in machines of my earlier inventions only four means provided resistance of the sectors of rotor and end walls against forces in tangential directions, namely the uninterrupted inner portions and a bolt means in each sector, the the body and its center portion, end walls and end covers are, since the machines have at least five slots and rotor sectors, kept tangentially rigid by at least 30 places, namely the uninterrupted annular outer portions 91, the uninterrupted innermost annular portions and the centering means 88 or 89, which may additionally fit in the end covers.

The slotted bodies of this invention are therefore roughly at least 30/4 i.e. about 7 times stronger in tangential direction, than those of my earlier inventions. They therefore definitely prevent the appearance of a leakage through clearance between vane faces and slot walls. They also prevent the appearance of a clearance between the outer peripheral faces of the end walls and surrounding cover means and prevent therefore any leakage at those places.

The strengthening of the slotted body in accordance with this invention makes it possible in many cases that the body parts need not in all cases be made of steel, iron or bronze. On the contrary, the multiple increase of the radial and tangential strength of the body of this invention makes it often possible, to press the parts of the slots containing body either of synthetic or pressed powdered material and, sintermetal. It is possible to die-cast them. This is especially convenient if the body consists of discs, like in FIGURES 15 to 29. Those parts, if made of sintermetal have precisely registering slots after pressing and do not need any finishing of slots after pressing. They need only plane grinding of the disc parts. The simplification has advanced this machine of the invention for mass application and it has narrowed their production cost extensively.

In one of the slots in FIGURE 16 the vane, is omitted in order to show clearly in the longitudinal sectional view of FIGURE 15 how the portions of the slots are located in respect to adjacent parts and where they are located in a assembled body or rotor of a fluid handling device.

In FIGURES 17 to 22 a disc formed center portion, a separated disc formed end wall and a separated disc formed end cover of a body of the embodiment of FIGURES 15 and 16 are shown. Thereby it is clearly visible, where the slots or slot portions, the centering bores 58 and the uninterrupted annular outer portions are located, how the slot portions register and how the center-ring bores are registering. It is thereby also apparent, that the parts can be pressed and that during pressing the stamps can be guided above and below the to be pressed member, so that the member can be pressed in axial direction, whereby high precision guiding of the forms and stamps can be assured and maintained.

In FIGURES 23 to 29 another embodiment of a fluid handling device of this invention is illustrated. Those parts are shown in the figures which differ from the respective parts in FIGURES 15 and 16.

One feature of this embodiment of the invention is, that the rotor passages 184 are eliminated and replaced by the substantially axially extending rotor passages 98. The control body 581 is located on one end of an end cover of the body. On the other end of the slots-containing body in the other end cover thereof are fluid containing chambers 99 provided, whereinto the closure members 55 of FIGURE 29 can be inserted, while they are sealed at the walls of chambers 99 by seals 56. The closure members 55 may be supported on a thrust member or on a rotary member, which limits their outward axial movement. Fluid is passed out of the respective intervane space 95 through communication passages 52 through the one end wall and end cover into the respective fluid containing chamber 99. This fluid presses the closure member 55 outward in axial direction against the thrust bearing and the reaction force of the fluid containing chamber 99 presses the end cover 96 against the end wall 84, the end wall 84 against the central rotor portion 481, the central rotor portion 481 and end wall 483, against the other end cover 485 and end cover 485 against control body 581. The end face of end cover 485 forms a rotary control face and moves along the stationary control face of control body 481 whereagainst it is pressed for tight sealing slide by the fluid in fluid containing chamber 99. All parts are by this way axialwardly pressed together, so that mechanical retaining means like bolts etc. can eventually be spared. Fluid flows then out of control port 481 through passages 98 into intervane spaces and out of intervane spaces into control ports 482 or vice versa. Vanes 185 and rotary casing 82 are inserted respectively assembled as in FIGURES 15 and 16. This embodiment of the invention provides a very simple machine, in which a cylindrical controbody in a rotor hub can be omitted. At the same time keyways 59, hexagons or the like can be provided as recesses in the center bore of the slotted bodies, so that a shaft can then extend into or through the body and through the whole device.

These figures also show how an assembly and retaining of the parts of a body assembly with axial fluid supply is possible. For this purpose the one end wall 483 is made integral with the center portion or rotor 481. The bores 58 are from the end of the end wall 483 enlarged in the central portion 481, so that each bore forms a shoulder therein. It has an opening toward a neighbouring intervane space, forming a passage thereby. A head of a bolt can then be inserted into enlarged recess 97 until the head comes to rest on the shoulder thereof and the shaft of the bolt extends through bore 58. End wall bore 58 and end cover bore 53 can then be pulled over the shaft of the bolt and the nut can be inserted into recess 53, so that by fastening the nut, end wall member 483, center portion 481, end wall 84 and end cover 96 are centered, fixed and retained together.

End cover 485 should receive a pin for restricting tangential movement relative to end wall member 483. A axial fixing is not entirely necessary between end wall portion 483 and end cover 485, since they are pressed together by pressure of the fluid containing chamber 99, which is correspondingly large dimensioned. Bore 98 of end cover 485 may act as the extended fluid passage 79–98, wherethrough the fluid flows into and out of the intervane spaces.

As can be seen again, all members except closure member 55 of FIGURES 23 to 29 can be pressed in pressforms, and the stamps for the making or forming the recesses can be guided before and behind the to be pressed part. These members, if pressed of metal, plastic or powder will therefore become so accurate, that the recesses, bores, etc., as well as radial faces do not need any machining any more.

Slotted bodies or rotors of the embodiments of the invention, especially those shown in FIGURES 15 to 29 are so rigid and capable of handling fluid under high pressures and high power, that they provide a useful and economic service, because they prevent any elongation, deformation, occurrances of widening clearances under high pressure and leakage losses therethrough. They have effectively eliminated the weak points of my earlier fluid handling devices and thereby they have increased their efficiency and power per size and weight. The radial widening of annular casing or enclosure part around the end walls has been prevented and so has been the tangential angular deformation of the central and end wall portions of the earlier rotors.

In the embodiment of FIGURES 17 to 29 it is also shown, how the rotor assembly is axially pressed against a stationary control face of control body by the insertion of the closure means 55 into the fluid containing chambers 99 and by supporting the closure means 55 on a thrust bearing or on a rotary member, so that the reaction force presses the rotor against the stationary control face of the stationary control body.

However, the pressure in modern fluid handling devices has now so very much increased, that in prior art devices the high fluid pressure which acts tangentially relative to the rotor upon the vanes presses the vanes so strongly against the opposite guide face of the longitudinal slot wall that the slot walls are deformed a fraction of a thousandth of an inch in tangential direction. Thereby a small clearance gap appears between the other guide face of the other slot wall and the vane means. A certain quantity of flow of fluid flows through the said small clearance slot from the working chamber into the slot space or vice versa. Thereby the volumetric efficiency of the fluid handling devices of the prior art decreases.

While the mentioned tangential deformation and flow of leakage fluid was only little and thereby negligible in fluid handling devices of low medium fluid pressure; they reached large proportions at a higher pressure, so that the fluid handling devices could no more fully succeed at high pressure. As far as side covers were screwed to rotors in earlier machines, the fastening bolts were set so much radially inwards spaced from the outer portions of the slots containing body or rotor that such fastening bolts failed to prevent the described tangential deformations and the leakage flow.

The present invention overcomes such drawbacks of earlier fluid handling devices thereby, that uninterrupted annular portions are provided on the outer peripheral portions of the slotted body.

Thereby the sectors between the slots of the body are at their outer portions so rigidly held by the integral uninterrupted annular portions, that the desired tangential rigidity of the slot walls is assured and a fluid-tight seal is maintained between said guide faces and said vane means.

This invention has thereby succeeded, to prevent or reduce tangential deformations and the leakage flow of fluid and has succeeded thereby to provide an effective fluid handling device of high power.

Having thus fully described my invention what I claim is:

1. In a fluid handling device, a slotted body having a center portion and end portions on each end of said center portion, said end portions extending in radial direction beyond the periphery of said center portion, said slotted body being formed with slots forming sectors in the same and extending in radial direction in said center portion and into said end portions, the slot portions in said end portions being spaced from the periphery of the respective end portion so that annular uninterrupted peripheral portions of said end portions integral with the same at least partially close the outer radial ends of said slots and rigidly connect said sector in circumferential direction; a closure body located at least partially spaced in radial direction from said center portion, said closure body having end faces and having substantially the same axial length as said center portion of said slotted body, said end portions of the slotted body having each an inner face being in at least partial sliding and sealing engagement with said end faces, respectively, said center portion, said end portions and said closure body forming a working space; means for closing the axial ends of said vane slots; vane means slidably mounted in said slots and extending in said slots into said end portions, said vane means dividing said working chamber into a plurality of intervane spaces and being in sliding engagement with said face of said closure body; and inlet and outlet means communicating with said intervane spaces so that fluid enters into expanding intervane spaces and is expelled from contracting intervane spaces when at least one of said bodies moves relative to the other body, said uninterrupted integral peripheral portions of said end portions preventing angular displacement of said sectors and tangential spreading of said slots by fluid pressure acting in some of said intervane spaces on said vane means whereby the information of gaps between said vane means and the surfaces of spread slots, and leakage through said gaps is prevented.

2. The device of claim 1 wherein said slots extend in axial direction through the center portion and through said end portions of said slotted body; and comprising end covers abutting said end portions for closing the axial ends of said slots.

3. The device of claim 2 wherein intersecting corner recesses are provided between two adjacent walls of said slots.

4. The device of claim 1 wherein said slotted body includes uninterrupted integral annular portions located at the inner radial ends of said slots in said center portion and also in said end portion for closing the radially inner ends of said slots.

5. The device of claim 4 and including uninterrupted integral portions of said end walls for closing the axial ends of said slots.

6. The device of claim 1 wherein said slotted body has a central cavity.

7. The device of claim 6 wherein said slotted body has passages extending between said cavity and said slots.

8. The device of claim 6 wherein said slots extend into said cavity.

9. The device of claim 1 wherein said closure body has a plurality of parts secured to each other and separable for assembly.

10. The device of claim 1 wherein said slotted body is one integral body including said center portion and said end portions.

11. The device of claim 1 wherein said end portions have uninterrupted portions for closing the radially inner and outer end, and also the axial ends of said slots in said end portions.

12. The device of claim 11 wherein said center portion includes an uninterrupted part for closing the radially inner ends of said slots in said center portions.

13. In a fluid handling device, in combination, a slotted body, having a center portion and an end wall on each end of said center portion, said end walls projecting radially beyond said center portion; a closure body located opposite said center portion and having end faces; said end walls having inner confronting faces at least partially in contact with said end faces of said closure body so that a working space is formed between said slotted body and said closure body, said slotted body being formed with substantially radial slots extending into said center portion and into said end walls extending axially through the same, said slots forming sectors of said slotted body between each other; vane means located in said slots for moving therein inward and outward, said vane means dividing said working chamber into a plurality of intervane spaces expanding and contracting during operation of the device; cover means including end covers in contact with said end walls for closing the axial ends of said slots; at least one of said bodies being formed with passage means and communicating with ports formed in said end covers and through said ports with intervane spaces; control means including inlet and outlet means for controlling the supply and discharge of fluid to the device whereby fluid pressure acts in tangential directions on said vane means tending to angularly displace said sectors; the portions of said slots located in said end walls being spaced from the periphery of the respective end wall so that annular uninterrupted integral peripheral portions of said end walls partially close said slots and rigidly connect said sectors in circumferential direction so as to prevent tangential spreading of said slots and the formation of gaps between said vane means and the walls of said slots, and consequent leakage through the gaps between said slots and said intervane spaces, said slotted body including said center portion and said end walls having annular uninterrupted integral portions closing the radially inner ends of said slots, at least said center portions and said end walls being formed with angularly spaced axially extending aligned bores; and bolt means located in said aligned bores for securing said end walls to said center portion.

14. The device of claim 13 wherein said end covers have angularly spaced bores registering with said aligned bores in said slotted body; and wherein said bolt means pass through said bores in said end covers for holding the same in abutment with said end walls.

15. The device of claim 13 wherein said slotted body has a center bore; and including a control body having an inlet and an outlet for fluid, and being mounted in said center bore.

16. The device of claim 13 including a control body having inlet and outlet means and abutting an outer face of one of said end walls.

17. The device of claim 13 wherein said center portion is integral with at least one of said end walls.

18. The device of claim 13 wherein said slotted body is a rotor assembly having end walls separated from said center portion; and including means for axially supporting said rotor assembly; and an axially movable control body abutting an end face of said rotor assembly and having inlet and outlet means for controlling the flow of fluid into and out of said device.

19. The device of claim 18 wherein said center portion, said end walls, and said end covers are discs forming said rotor assembly.

20. The device of claim 13 wherein at least one of said end covers has a fluid containing chamber open at one axial end of said slotted body and communicating with an associated intervane space; and including a closure member mounted in said chamber for axial movement and for feeding the same in one axial direction; and comprising means supporting said closure member in axial direction whereby said end covers, said end walls, and said center portion are pressed together in axial direction by the fluid pressure in said chamber.

21. A vane supporting assembly for a fluid handling device, comprising, in combination, body means including a substantially cylindrical center portion and two end members at the axial ends of said center portion, respectively, extending in radial direction outward beyond the periphery of said center portion, each end member being an integral piece, said center portion and said end members being formed with angularly spaced substantially radial, axially extending vane slots, each vane slot including a central slot portion in said center portion and a slot extension in each of said end members, said slot extensions having radially outer ends spaced from the outer periphery of the respective end members so that an annular uninterrupted peripheral portion of each end member integral with the same connects sector-shaped portions of said supporting body means formed between said vane slot; means for closing the outer axial ends of said vane slots; and vane means guided in said vane slots whereby fluid pressure acting in tangential direction on said vane means and through the same on said sector-shaped portions is prevented by said annular uninterrupted peripheral integral portions of said end walls from spreading said vane slots and from forming a gap between said vane means and the walls of said slots causing leakage flow.

22. A vane supporting assembly as claimed in claim 21 wherein said end members are end walls formed with radial, angularly spaced slots therethrough constituting said slot extensions and being bounded on the inner and outer ends thereof by annular integral inner and outer wall portions, said annular outer wall portion constituting said peripheral annular portion of the respective end member; and comprising cover plates covering the outer end faces of said end walls and closing the axial ends of said slot extensions; and means for securing said center portion, said end walls, and said cover plates to each other in an assembled position abutting each other in axial direction.

References Cited

UNITED STATES PATENTS

| | | | |
|---|---|---|---|
| 1,153,874 | 9/1915 | Shore | 230—152 |
| 1,488,729 | 4/1924 | Ballay | 103—136 |
| 2,098,652 | 11/1937 | Buckbee | 103—136 |
| 2,264,616 | 12/1941 | Buckbee | 230—152 |
| 2,590,728 | 3/1952 | Scognamillo | 103—136 |
| 2,731,920 | 1/1956 | Scognamillo | 103—136 |
| 2,938,468 | 5/1960 | Kececioglu et al. | 103—136 |
| 2,975,716 | 3/1961 | Eickmann | 103—136 |
| 3,246,574 | 4/1966 | Eickmann | 103—136 |
| 3,256,831 | 6/1966 | Eickmann | 103—136 |
| 3,274,945 | 9/1966 | Eickmann | 103—136 |

FRED C. MATTERN, Jr., *Primary Examiner.*

WILBUR J. GOODLIN, *Assistant Examiner.*

U.S. Cl. X.R.

103—121